United States Patent [19]

Kato et al.

[11] Patent Number: 5,005,500
[45] Date of Patent: Apr. 9, 1991

[54] AUTOMATIC EMBROIDERING MACHINE WITH PATTERN INPUT MEANS

[75] Inventors: Kenji Kato, Hachiohji; Mikio Koike, Oume; Akira Orii, Hachiohji; Shinichi Fuchigami, Fussa, all of Japan

[73] Assignee: Janome Sewing Machine Co., Ltd., Tokyo, Japan

[21] Appl. No.: 558,742

[22] Filed: Jul. 27, 1990

[30] Foreign Application Priority Data

Jul. 28, 1989 [JP] Japan .................................. 1-193910
Jul. 28, 1989 [JP] Japan .................................. 1-193911
Jul. 28, 1989 [JP] Japan .................................. 1-193912

[51] Int. Cl.$^5$ ............................................ D05B 21/00
[52] U.S. Cl. ............................ 112/121.12; 112/103; 112/457; 364/470
[58] Field of Search .................... 112/121.12, 103, 456, 112/457, 121.11, 453, 445; 364/470

[56] References Cited

U.S. PATENT DOCUMENTS

| 4,290,375 | 9/1981 | Tonomura et al. | 112/121.12 |
| 4,692,871 | 9/1987 | Kinoshita et al. | 364/470 |
| 4,849,902 | 7/1989 | Yokoe et al. | 112/121.12 |

*Primary Examiner*—Peter Nerbun
*Attorney, Agent, or Firm*—Dann, Dorfman, Herrell and Skillman

[57] ABSTRACT

An original picture pattern to be produced with an embroidering machine may be seen through a transparent touch panel of an input device detachably connected to the embroidering machine. By simply tracing the coutour lines of the pattern with a stylus pen, the coordinates of substantially continuous points of the pattern may be inputted. A series of the coordinate data thus inputted is converted to another series of the coordinate data representing actual stitch points of a pattern to be produced on the fabric as a boldfaced duplicate of the original picture. Each line of the pattern may be boldfaced with zigzag stitches extending over a selectable amplitude or with multiplicated straightaway stitches formed by a repeated straight line producing operation.

11 Claims, 9 Drawing Sheets

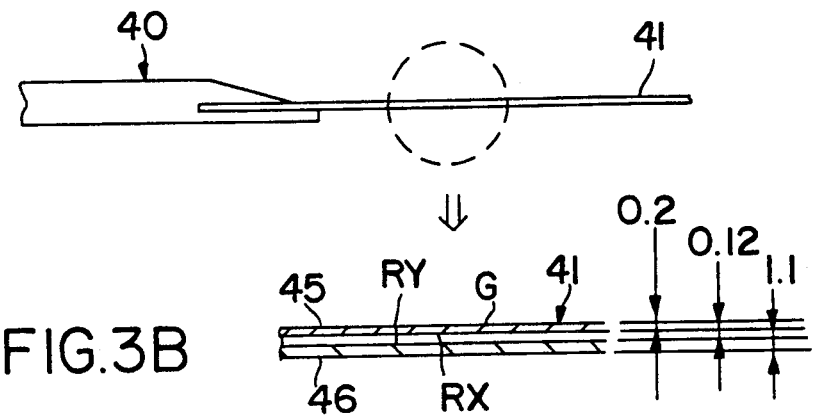
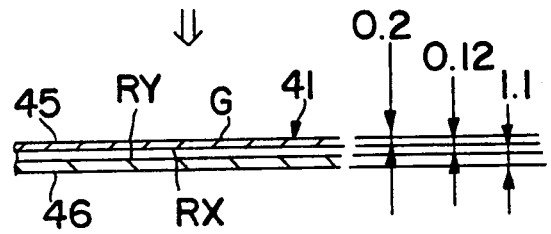
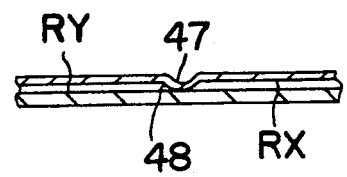
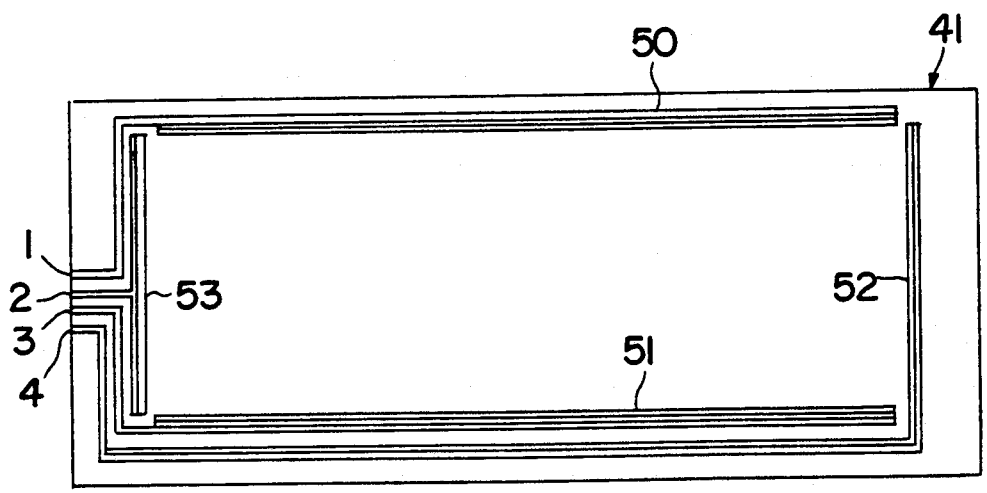

AUTOMATIC EMBROIDERING MACHINE WITH PATTERN INPUT MEANS

BACKGROUND OF THE INVENTION

1. Field of the Invention

This invention relates to an electronically controlled embroidering machine capable of producing a desired stitch pattern in accordance with stitch control data thereof already stored in a memory mounted in the machine. This invention is particularly directed to an automatic embroidering machine with a detachable pattern input device by which an original picture pattern such as one appearing on a sketchbook is easy to be inputted even by an unskilled operator, so that the embroidering machine is operable in accordance with the inputted data to produce a duplicate of the original picture pattern, which may be a boldfaced pattern if so desired.

2. Description of the Prior Art

With electronically controlled sewing machines, stitch patterns may be produced in accordance with stitch control data stored in advance in a memory mounted in the sewing machine housing. The operator manipulates select switches or keys as desired to designate a selective one or combination of the stitch patterns. The stitch control data of the selected stitch pattern or pattern combination will then be read out from the memory to drive under control stepping motors for controlling a needle amplitude and a fabric feeding amount in every stitch, thereby producing the selected stitch pattern or pattern combination on the fabric in a known manner. Another type sewing machine, which may be sometimes called an embroidering machine, has also been proposed in which an embroidery frame for supporting the fabric in a stretched fashion is, in turn, movably supported to the machine housing. Movement of the embroidery frame in perpendicular two directions will be controlled by the stitch control data to produce a desirable one of the registered patterns, which could not be produced with the ordinary sewing machine due to the limited amplitude of the needle.

There may arise an additional need for producing stitch patterns rather than those having been registered in the electrically controlled sewing machine or embroidering machine. The stitch control data of such additional stitch patterns should be arranged by the operator and may be stored in the memory in the same manner as in the case of the previously registered stitch patterns.

Japanese Patent Publication No. (Sho) 61-25379 discloses a manner in which original stitch patterns will be inputted so that the stitch control data thereof may be created and registered in the memory. More particularly, this conventional technique utilizes a stylus pen cooperating with an input display board to designate successive stitch points of the stitch pattern to be now registered. Coordinates of each stitch point thus defined on the input display board by the stylus pen will be registered in due order in the memory as the stitch control data of the original stitch pattern. Responsive to the stitch control data now stored in the memory, the original stitch pattern may be produced, but as a series of simple straightaway stitches which respectively connect between the adjacent two stitch points. The original stitch pattern thus produced on the fabric might appear to be frail and unemphasized and could not be applicable as an applique. This conventional technique invloves the use of so-called zigzag sewing machine for domestic use so that a breadth of the original stitch pattern actually produced on the fabric should not exceed a predetermined maximum amplitude of a laterally swingable stitch needle of the zigzag sewing machine. Moreover, the input display board is composed of a multiple layer of switching elements which is not transparent and therefore makes it difficult and time-consuming to input the successive stitch points of the original stitch pattern. Exact duplication of the original stitch pattern would hardly be expected, resulting in distortion and deformation thereof when actually produced on the fabric.

With an automatic embroidering machine for industrial purposes, stitch control data of an original stitch pattern may be inputted in such a manner as shown in FIG. 15 which will be produced into an embroidery pattern as shown in FIG. 16. More specifically, a first arcuate section defined by a first pair of arcs C1 and C2 will be inputted by designating in opposite ends 1, 5 and 2, 6 and the apexes 3 and 4 with a digitizer or any other inputting medium. A second arcuate section defined by a second pair of arcs C3 and C4 are similarly inputted by designation of points 7 to 10. The next section is rectangular and defined only by designating points 11 and 12 to be located in opposition to the previously designated points 7 and 10. The next section is a third arcuate section which is inputted in the same way as in the first and second arcuate sections. In such manner, the respective sections divided by dotted lines in FIG. 13 may be sequentially inputted to store the stitch control data thereof in a memory means such as a flexible floppy disc. When the stitch control data is sequentially read out from the memory to drive under control the automatic embroidering machine, the original embroidery pattern may be produced as a boldfaced pattern as seen in FIG. 14, with the inside of the respective sections being crowded with sequential zigzag stitches. The designation of the respective points, which will be essential to define the respective sections, is very difficult to operate even by an expert.

SUMMARY OF THE INVENTION

It is therefore an object of this invention to provide an automatic embroidering machine capable of inputting and producing original stitch patterns while eliminating disadvantages of the prior art technique.

Another object of this invention is to provide an original pattern input system which is easy to operate even by an unskilled operator and makes it possible to duplicate the original pattern on the fabric as a boldfaced pattern providing an emphasized, remarkable appearance.

According to an aspect of this invention there is provided an automatic embroidering system comprising a sewing machine having a vertically reciprocating needle, a loop-taker means cooperating with the needle to form a stitch on a fabric, an embroidery frame located between the needle and the loop-taker means for supporting the fabric and a drive control means for shifting under control the embroidery frame in perpendicular two directions to provide a specific point at which the needle penetrates the fabric to form the stitch; input means arranged separately from the sewing machine but connectable thereto for inputting a first series of data representing coordinates of substantially continuous points on an original pattern to be reproduced with the sewing machine; first memory means for storing the first series of pattern data; converting means for converting the first series of pattern data into a second series of data representing coordinates of stitch points of a pattern to be actually produced on the fabric with the sewing machine as an boldfaced reproduction of the original pattern; and second memory means for storing the second series of pattern data. The second series of pattern data is sequentially read out from the second memory to control operation of the drive control means provided in the sewing machine which is thus operable to produce the boldfaced pattern on the fabric.

BRIEF DESCRIPTION OF THE DRAWINGS

Further objects and advantages of this invention will be understood from the following description when read in conjunction with the accompanying drawings in which:

FIG. 3(A) through FIG. 3(D) are views showing a touch panel in an input device, one of essential constituents of the embroidering machine, in which FIG. 3(A) is a longitudinal sectional view of the touch panel, a circled portion being shown on an enlarged scale in FIG. 3(B), FIG. 3(C) is an explanatory view of the portion shown in FIG. 3(B) when the touch panel is depressed at a specific point and FIG. 3(D) is a plan view showing arrangement of electrodes in the touch panel;

DETAILED DESCRIPTION OF THE EMBODIMENTS

Figure 1:
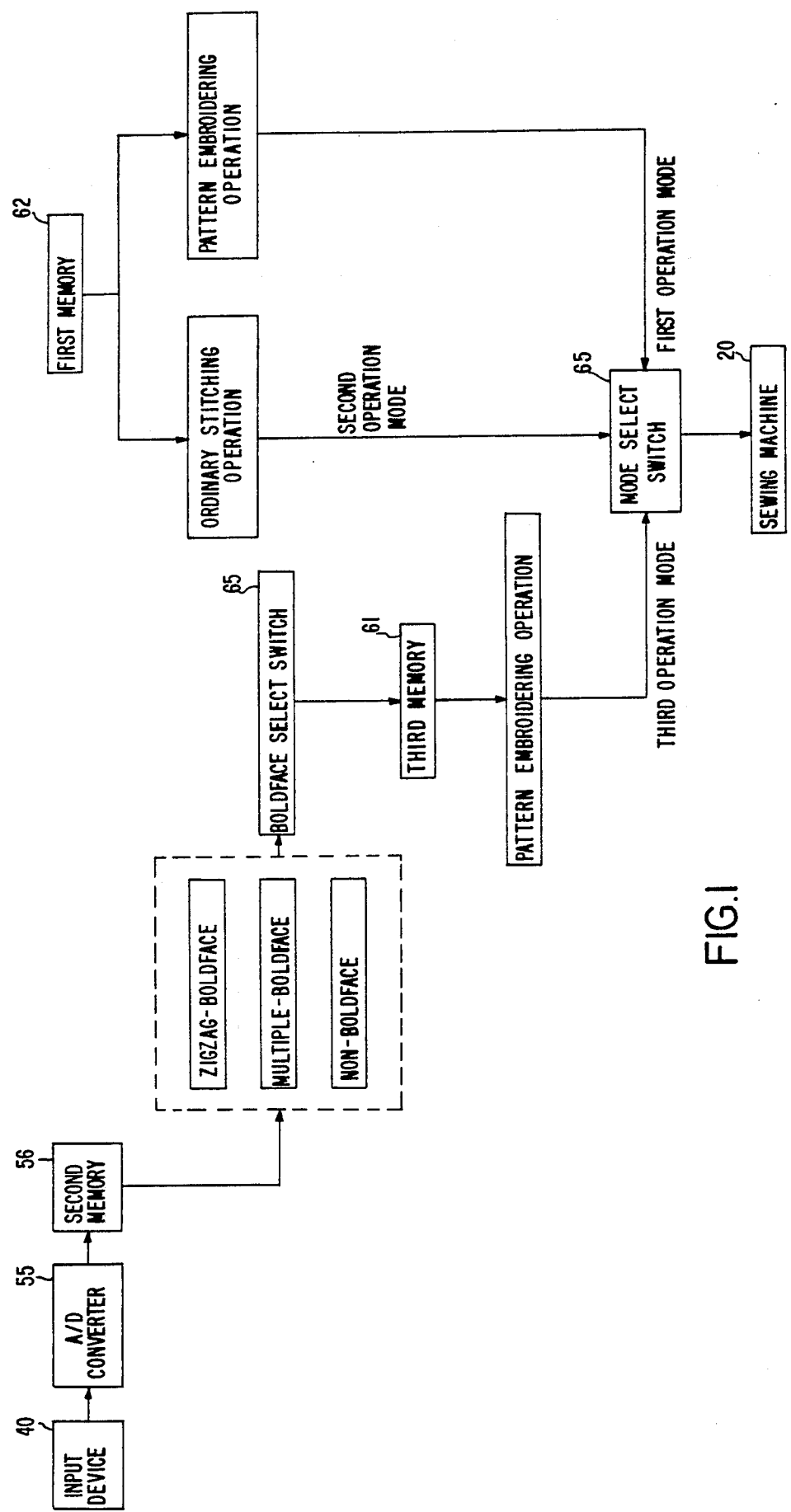
FIG. 1 is a block diagram showing general arrangement of a control system of an automatic embroidering machine embodying the invention.
Figure 2:
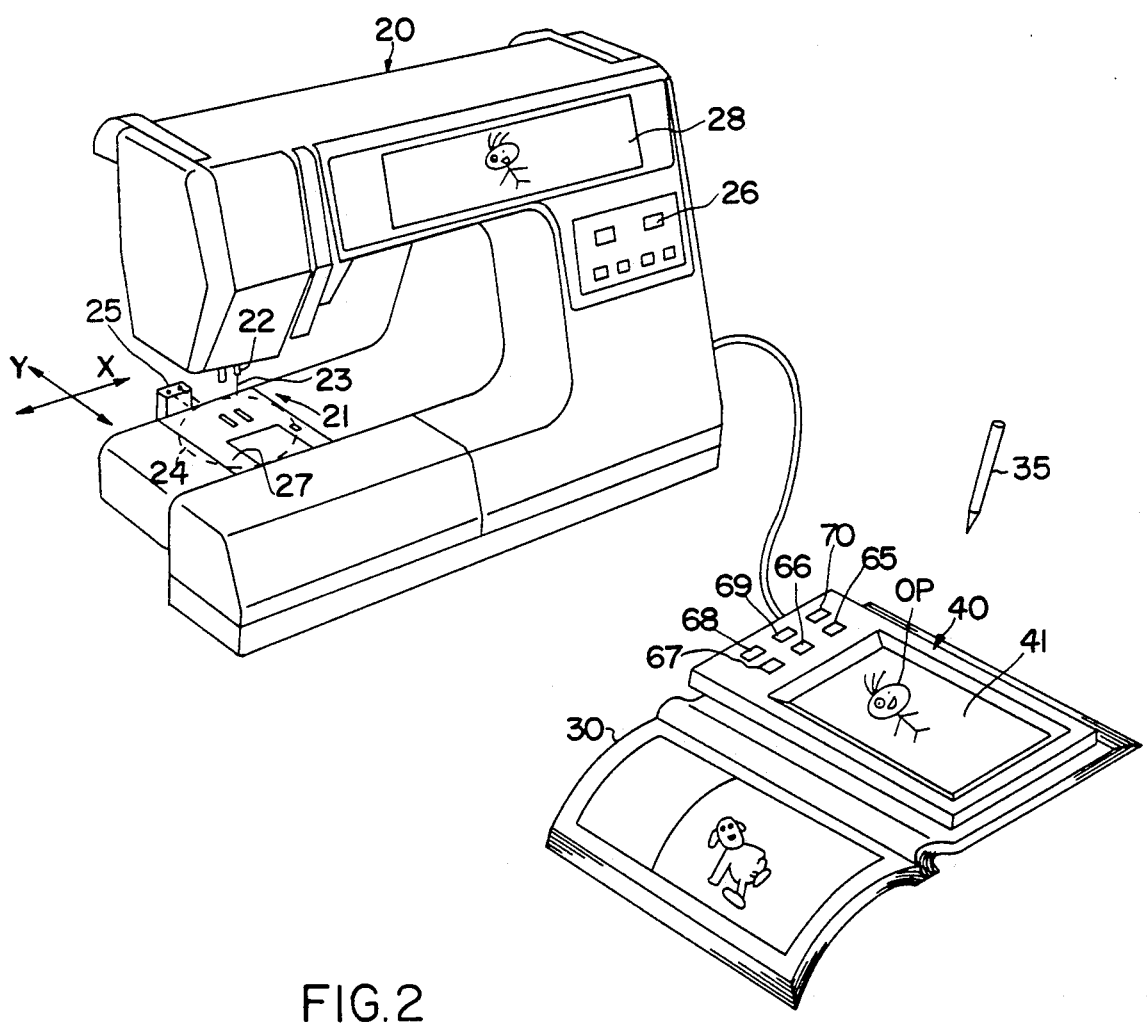
FIG. 2 is an oblique view showing a grammatic appearance and arrangement of the embroidering machine.

An automatic embroidering machine embodying the invention is diagrammatically illustrated in FIG. 2 in which an input device 40 is electrically connectable to a sewing machine 20 which is itself substantially identical to a conventionally known embroidering machine. The sewing machine 20 includes a stitch forming instrument generally referred to by a numeral 21 comprising a needle 23 secured to the tip end of a vertically reciprocating needle bar 22 and a loop-taker means (not shown) cooperating with the needle 23 to form a stitch in every reciprocation of the needle 23. A fabric or workpiece is supported by a detachable embroidery frame 24, shown by dotted lines, which is positioned between the needle 12 and the loop-taker means and supported by a movable attachment 25 connected to a driving mechanism (not shown). The embroidery frame 24 may be moved on a horizontal plane in perpendicular two directions X and Y so that the needle 23 may penetrate a definite point of the fabric stretched within the embroidery frame 24, at which point a stitch will be produced by cooperation with the needle 23 and the loop-taker means. Thus, the sewing machine 20 is operable as a conventional embroideridng machine in a first operation mode. Embroidery pattern control data for controlling movement of the embroidery frame 24 in each stitch forming operation is stored in advanced in a memory 62 (FIG. 1).

In the illustrated embodiment the sewing machine 20 is also operable as a conventional zigzag sewing machine. The needle 23 is designed to be allowed to swing in a lateral direction X within a predetermined maximum amplitude, as well as to reciprocate in a vertical direction. Though not shown in the drawing, a conventional fabric feeding mechanism is arranged to feed the fabric in the direction Y. Under control of the needle amplitude and the fabric feed amount in each stitch forming operation, a stitch pattern may be produced on the fabric as a series of zigzag and/or straightaway stitches. Such stitch control data for a plurality of stitch patterns are also stored in advance in the memory 62. When the sewing machine 20 is operating in a second operation mode, that is as a conventional zigzag sewing machine, the fabric feeding mechanism is retracted away from its functional position so as not to interfere with movement of the embroidery frame 24.

The sewing machine 20 is provided with a mode select switch 26 which is depressed to designate a selective one of the operation modes. The sewing machine 20 operates in a third operation mode such that it cooperates with the input device 40 to produce an original stitch pattern in accordance with pattern control data which is inputted by the operator in a manner described hereinlater. The input device 40 has a transparent touch panel 41 embedded in a synthetic frame including several keys or switches 65 to 69 at an upper portion thereof. Operation of the switch 65 will determine a specific manner in which pattern control data is prepared based on the coordinate data inputted by the operator. A selective one of three conversion modes may be designated by the switch 65, so that the inputted picture may be produced with zigzag stitches, multiple straightaway stitches and a single straightaway stitch in first, second and third conversion modes respectively. In the first or second conversion mode, a picture pattern actually produced on the fabric based on the inputted coordinate data will be an emphasized, boldfaced pattern. The conversion mode may differ for different parts of the picture pattern.

The input device 40 may be placed on a spreaded page of a sketchbook 30, for example, so that an original picture OP illustrated on the spreaded page may be seen through the transparent touch panel 41. By simply tracing the original picture OP with a stylus pen 35, the coordinate data thereof may be inputted in due order.

In further reference to FIGS. 3(A) through FIG. 3(D), the transparent touch panel includes an upper layer 45 of approximately 0.2 mm thick reinforced glass plate which overlies an lower layer 46 of approximately 1.1 mm thick reinforced glass plate, with an air gap G of approximately 0.12 mm being defined therebetween. To the bottom surface of the upper glass plate 45 is attached a transparent thin film including a first resistance RX. Another transparent thin film including a second resistance RY is attached to the upper surface of the lower glass plate 46, which is therefore opposed to the first resistance RX with the small air gap G being defined therebetween. The first and second resistances RX and RY may be a mixture of indium oxide and tin oxide and may be adhered to the respective transparent thin films by way of spattering technique. The transparent touch panel has therefore usually a thickness of the order of 1.5 mm. When a specific point on the touch panel is depressed by the stylus pen 35 to form a recess 47 in the upper glass plate 45, as shown in FIG. 3(C), the first resistance RX comes into contact with the second resistance RY at an apex 48 of the recess 47.

Figure 4:
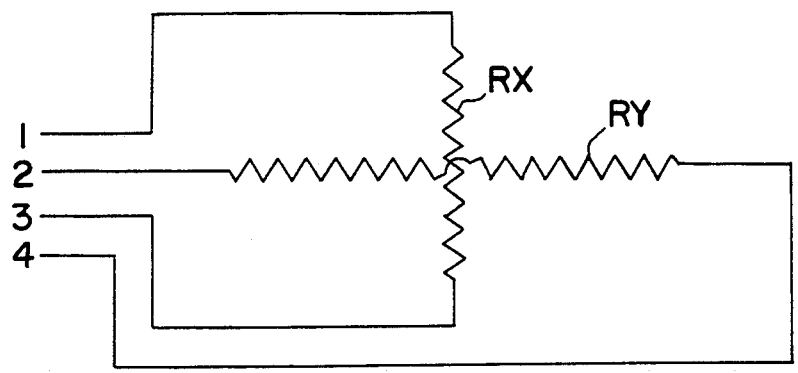
FIG. 4 is a circuit diagram showing relation between first and second resistances mounted in the touch panel.

The first and second resistances RX and RY have respectively a first pair of electrodes 50 and 51 for X-axis and a second pair of electrodes 52 and 53 for Y-axis, as can be seen in FIG. 3(D), each extending from its terminal 1 to 4. Such electrode arrangement will provide electric circuits shown in FIG. 4.

Figure 5:
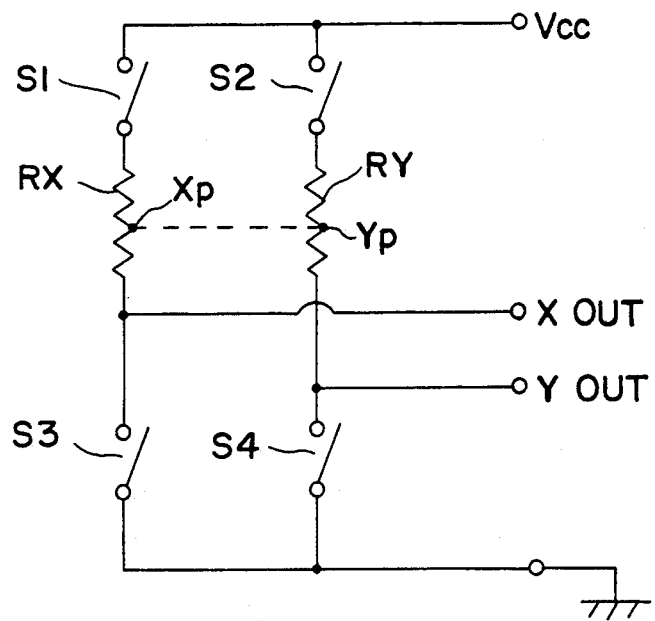
FIG. 5 is a control circuit diagram of the input device.
Figure 6:
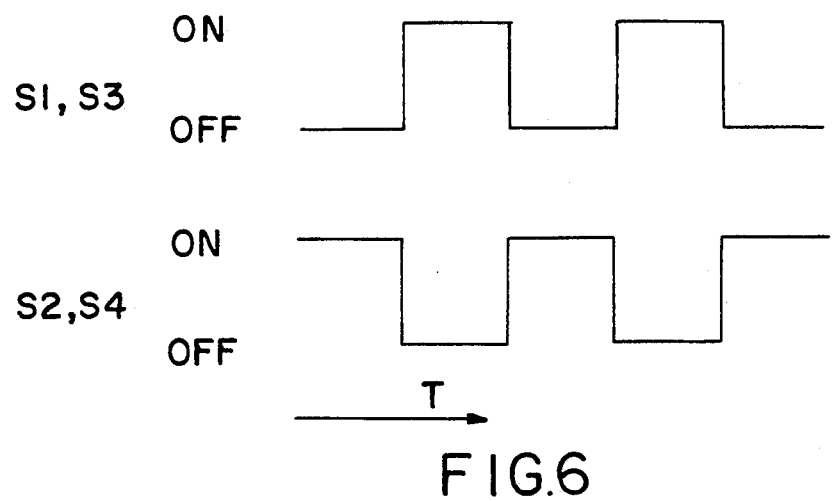
FIG. 6 is a timing chart of ON/OFF switching of switches provided in the control circuit of FIG. 5.

FIG. 5 shows a circuit for determining an ananlog voltage applied at the contact point 48. Electric switches S1 to S4 in this circuit will be periodically turned on and off as shown in a timing chart of FIG. 6. Let us now suppose that the first and second resistances RX and RY provide a specific contact point having coordinates (Xp, Yp). While the switches S1 and S3 are ON and the switches S2 and S4 are OFF, a constant voltage Vcc is applied to the first resistance RX so that a voltage value divided at a point Xp is outputted through a point Yp to an output terminal Xout. While the switches S1 and S3 are OFF but the switches S2 and S4 are ON, on the contrary, the constant voltage Vcc is applied to the second resistance RY so that another voltage value divided at the point Yp is obtained at an output terminal Yout. The coordinates of the contact point may thus be determined by the divided voltage values obtained at the output terminals Xout and Yout respectively. The X-coordinate and the Y-coordinate of the contact point will be inputted with a time delay which is, however, neglectable since the respective switches S1 to S4 are turned on and off at every momentary period such as about 10 milliseconds.

Now referring specifically to a block diagram of FIG. 1, the analog voltage values representing the coordinates of the contact point which have been inputted by means of the input device 40 will be converted by an analog-digital converter 55 into corresponding digital values, which are then stored in a second memory 56. When the stylus pen 35 is moved to depress another point of the touch panel 41 having at least one of its X- and Y-coordinates located remote from that of the previously inputted point by a distance larger than a predetermined analyzability of the touch panel 41 (approximately 0.2 mm in this example), the coordinates will be registered in the second memory 56 as a next point of the picture. In this manner of operation, a series of the coordinate data representing a contour or shape of the original picture OP to be produced may be inputted by simple tracing thereof with the stylus pen 35. The inputted pattern is shown in progress on a display 28 arranged on the sewing machine housing, as the stylus pen 35 is moved to a different, analyzable point. If the coordinate data should have been inputted in error, which may be known to the operator by comparison between the original picture OP seen through the transparent touch panel 41 and the pattern shown in the display 28, the said data stored in the second memory 56 should be erased by depression of a cancel switch 66 provided on the input device 40. The coordinate data stored in the second memory 56 will then be converted into pattern control data in accordance with one of the conversion modes designated by operation of the switch 65, which will then be stored in a third memory 61 upon depression of a registration switch 68 (FIG. 2). The sewing machine 20 is operable in the third operation mode, which may be designated by operation of the mode select switch 26, to produce the pattern on the fabric in accordance with the pattern control data, substantially as an emphasized reproduction of the original picture OP.

Figure 7:
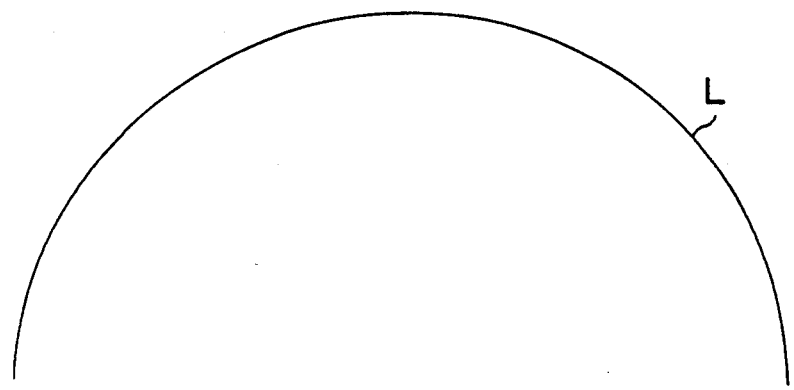
FIG. 7 is an example of a trace line obtained by respective input points designated by the input device.
Figure 8:
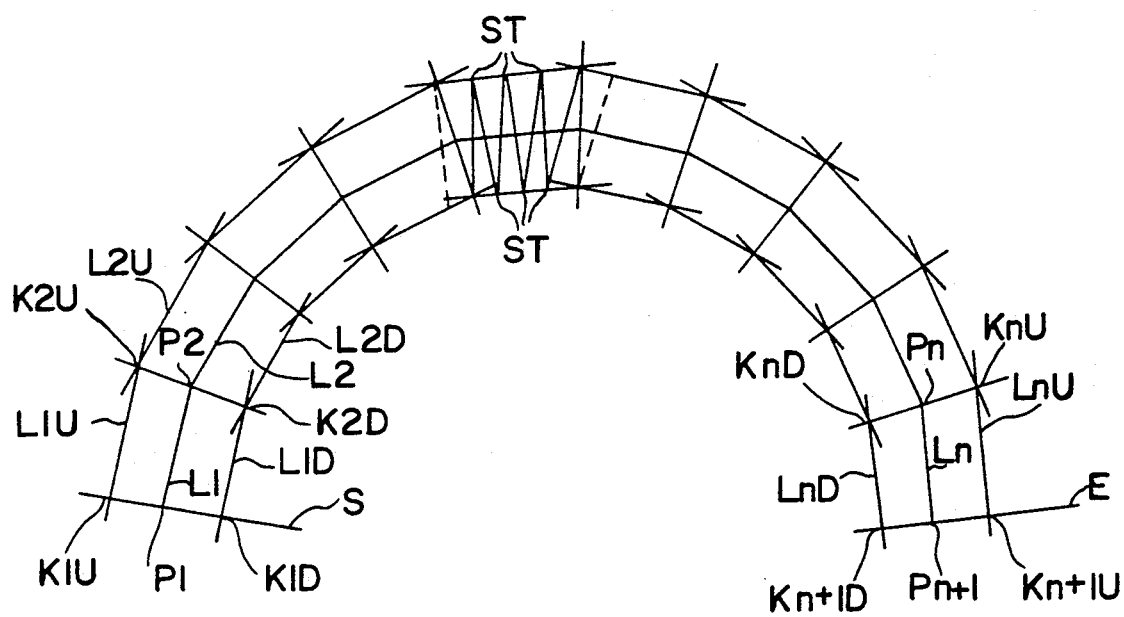
FIG. 8 through FIG. 10 are explanatory views showing diagrammatically a manner of conversion from the inputted coordinate data into corresponding zigzag-boldface control data.
Figure 9:
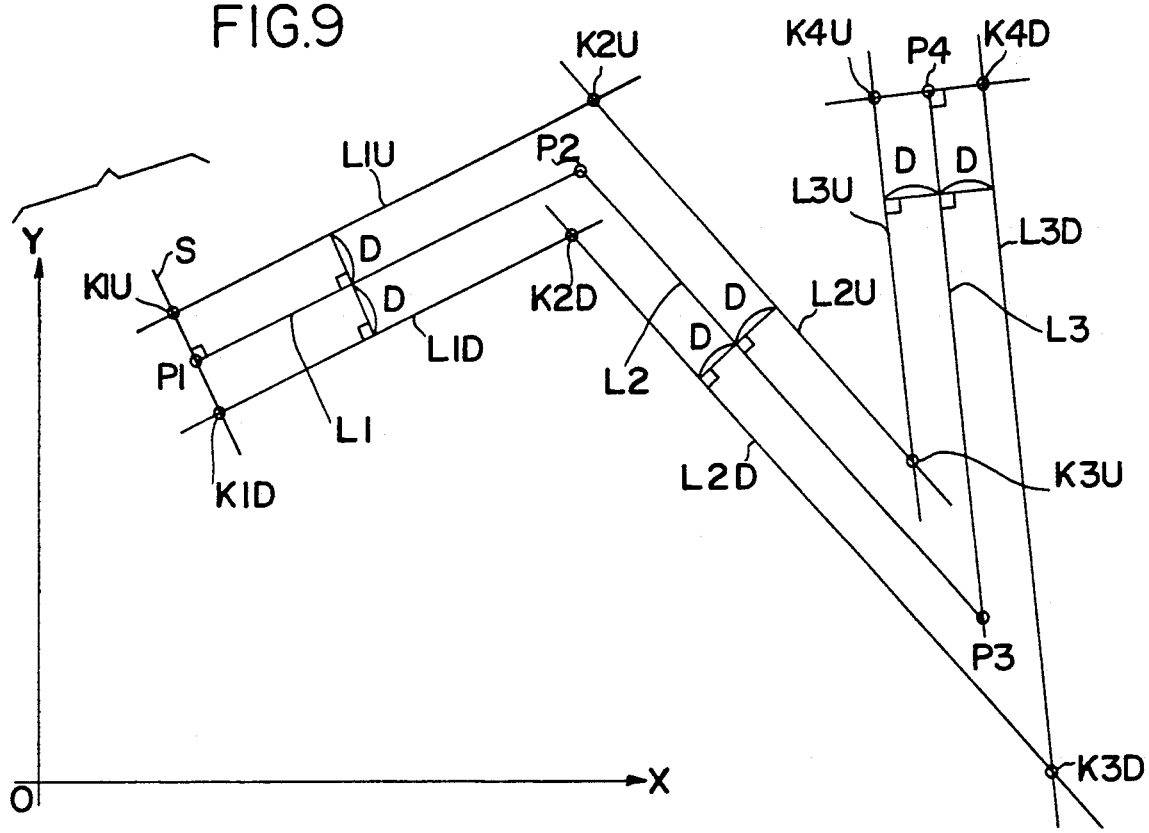

When, in the third operation mode of the sewing machine 20, the boldface select switch 65 is so operated as to designate the zigzag-boldfacing mode, the pattern control data will be prepared based on the coordinate data in the following manner. Suppose that a series of the coordinates inputted by the stylus pen 35 at 0.2 mm intervals will draw an arcuate trace L shown in FIG. 7. The trace L is divided at every few input points P1, P2 ... Pn and Pn+1 to obtain a sequence of linear segments L1, L2 ... Ln. An interval between the two adjacent points at which the trace line L should be divided may be selected by the operator's manipulation of a pitch select switch 67 provided on the input device 40. When the switch 67 is operated such that the trace line should be divided at evey five input points, the respective linear segments L1, L2 ... Ln will have substantially the same length of the order of 1.0 mm. Then, a pair of imaginary lines are drawn in parallel with the respective linear segments at opposite sides thereof. For example, a pair of parallel lines L1U and L1D are drawn with respect to the first linear segment L1 and another pair of lines L2U and L2D for the second linear segment L2, as shown in FIG. 8, thereby obtaining points of intersection K2U and K2D. The first intersections K1U and K1D will be given by the first imaginary lines L1U and L1D and a line S extending through the first input point P1 in a direction normal to the first linear segment L1. Similarly, the last intersections KnU and KnD will be a crossing of the last imaginary lines LnU and LnD and a line E extending through the last input point Pn+1 in a direction normal to the last linear segment Ln. Thus, a sequence of rectangular block sections may be prepared, each section being defined by four corners which are intersections K1U, K1D, K2U and K2D; ... KnU, KnD, Kn+1U and Kn+1D.

Figure 10:
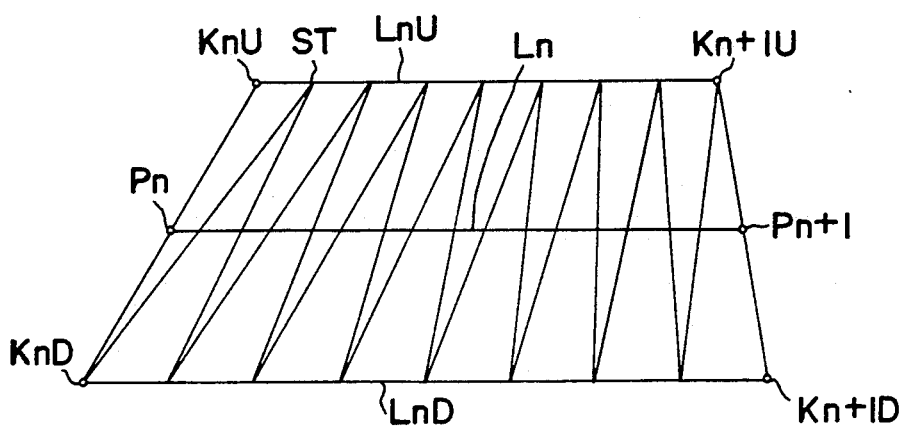

Then, coordinates of zigzag stitch points ST which are located on the two imaginary lines of each rectangular block section will be obtained in the following manner. Referring now to FIG. 10 showing another example of a trace line divided into plural linear segments L1, L2, L3, L4 . . . , each segments has a pair of imaginary liens L1U and L1D; L2U and L2D L3U and L3D; L4U and L4D . . . extending in parallel with the respective linear segments at opposite sides thereof and spaced therefrom by a predetermined equal distance D. The distance D may be varied by operation of a width select switch 69 (FIG. 2) arranged on the input device 40, whereby a width or amplitude of zigzag stitches of the pattern, that is a boldfacing degree of the inputted original picture pattern may be adjusted as desired.

When the input point Pn is supposed to have its coordinates (XPn, YPn) and the intersections KnU and KnD have their coordinates (XKnU, YKnU) and NXKnD and YKnD) respectively, the linear segment Ln and its imaginary lines LnU and LnD may be defined respectively by the following simple equations:

$$Ln: Y = An \cdot X + YPn - An \cdot XPn \tag{1}$$

$$LnU: Y = An \cdot X + D/\cos\theta n + YPn - An \cdot XPn \tag{2}$$

$$LnD: Y = An \cdot X - D/\cos\theta n + YPn - An \cdot XPn \tag{3}$$

where $An = (YPn+1 - YPn)/(XPn+1 - XPn)$ and $\theta n = \tan^{-1} An$. The coordinates of the intersections K1D to K4D; K1U to K4U will be determined by solving simultaneous equations of the two lines which provides crossing at the said intersection. For example, since the straight line S is represented by the following equation (4), the coordinates (XK1U, YK1U) of the intersection K1U will be determined by solving simultaneously the equation (4) and the equation (2) representing the imaginary line L1U into which n=1 should be inserted.

$$S: Y = B1 \cdot X + YP1 - B1 \cdot XP1 \tag{4}$$

where $B1 = -(YP2 - YP1)/(XP2 - XP1)$.

The coordinates of the respective zigzag stitch points to be located on the two imaginary lines in the rectangular block sections, which are defined by the four corner points having the coordinates thus detemined in the above-described manner, should be determined in a below-described manner. In particular reference to FIG. 10, the length ln, lnU and lnD of the straight lines Ln, LnU and LnD will be represented as follows:

$$ln = \sqrt{(XPn+1-XPn)^2 + (YPn\,1-YPn)^2}$$

$$lnU = \sqrt{(XKn+1U - XKnU)^2 + (YKn+1U - YKnU)^2}$$

$$lnD = \sqrt{(XKn+1D - XKnU)^2 + (YKn+1D - YKnD)^2}$$

The imaginary line LnU is divided into a given number N of equal segments to obtain the number (N−1) of intermediate points. These intermediate points will constitute the zigzag stitch points ST and have the coordinates (XSTn, YSTn) which are determined as follows:

$$XSTn = (XKn+1U - XKn) \cdot n/N$$

$$YSTn = (YKn+1U - YKn) \cdot n/N$$

The other imaginary line LnD is also divided into the same number N of equal segments to obtain the same number (N−1) of intermediate, zigzag stitch points, the coordinates of which will be determinable in the same way. The number N of the segments on the imaginary lines LnU and LnD will be determined by dividing the length ln of the linear segment Ln by a predetermined pitch P.

Figures 13A, 13B:
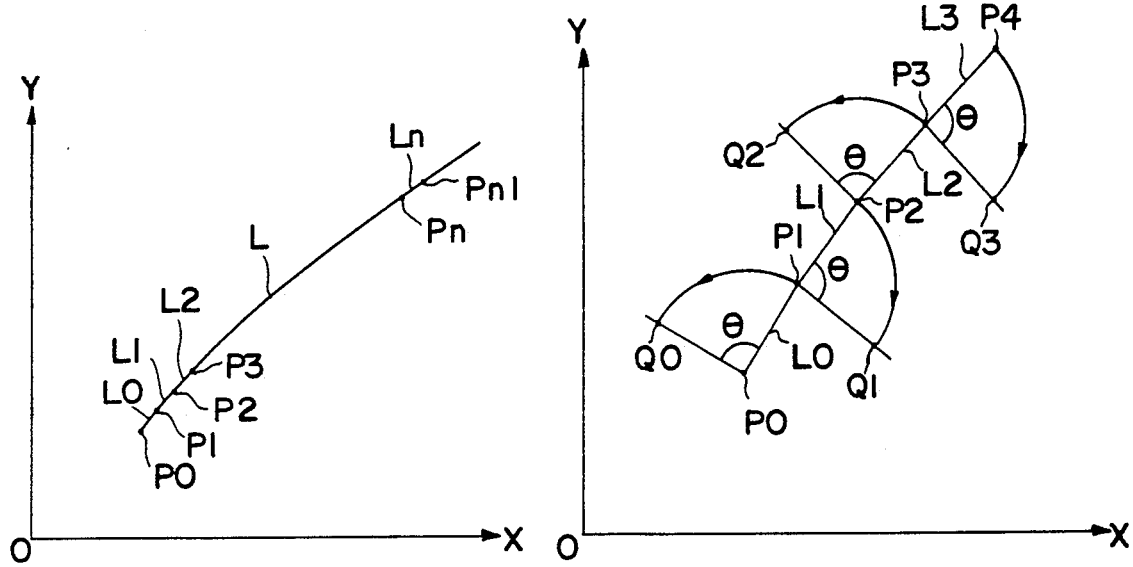
FIG. 13(A) through FIG. 13(D) are explanatory views showing diagrammatically another manner of conversion from the inputted coordinate data into corresponding zigzag-boldface control data.
Figures 13C, 13D:
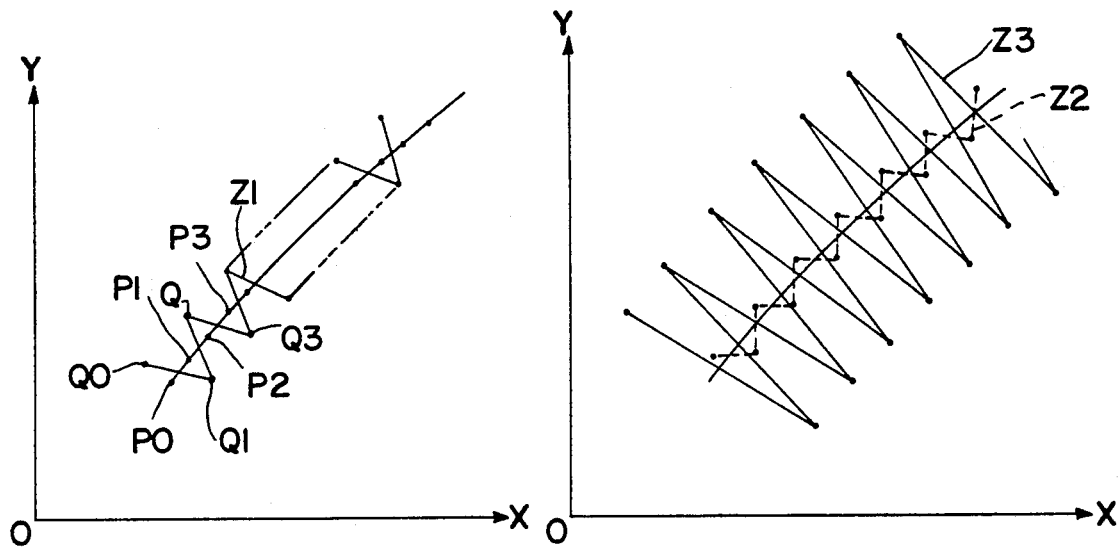

Another manner of conversion of the inputted coordinate data of the original pattern into zigzag-boldface control data will be described in reference to FIG. 13(A) through FIG. 13(D). First, as shown in FIG. 13(A), a trace line L which is obtained by continuously connecting the adjacent inputted points is divided at every five points into a plurality of linear segments L0, L1 . . . Ln having substanitally equal length of the order of 1.0mm, when so designated by the pitch select switch 67. The dividing points P0, P1 . . . Pn are then shifted away from the linear segments by rotation thereof alternately in clockwise and counterclockwise directions by a predetermined angle $\theta$. More particularly, the first segment L0 is rotated about the first dividing point P0 in a counterclockwise direction so that the second dividing point P1 is shifted to a point Q0, which is a conversion point determined in respect to the first dividing point P0. The second dividing point P1 is likewise shifted to a corresponding conversion point Q1 by rotation of the second linear segment L1 about the said point P1 in a clockwise direction. The direction of rotation will be the same for alternate linear segments so that adjacent two of the conversion points Q0, Q1 . . . Qn are always located in opposition across the line L. A series of data regarding the coordinates of these conversion points Q0, Q1 . . . Qn thus determined will be stored in the third memory 61, which are sequentially read out therefrom so that the line L is reproduced actually on the fabric as a series of zigzag stitches Z1 connecting the adjacent conversion points, as best seen in FIG. 13(C).

Suppose that the dividing point Pn has the coordinates (XPn, YPn), the coordinates (XQn, YQn) of the conversion points Qn may be determined by the following equations (5) and (6):

$$XQn = Un \cdot \cos\theta - Vn \cdot \sin\theta + XPn \tag{5}$$

$$YQn = VN \cdot \cos\theta - Un \cdot \sin\theta + YPn \tag{6}$$

where $Un = \beta(XPn+1 - XPn)$ and $Vn = \beta(YPn+1 - YPn)$. The conversion points are postioned somewhat remote from the inputted line L, a degree of which will be adjustable by changing the angle $\theta$ and/or the rate of magnification or reduction $\beta$. For example, two zigzag stitches Z2 and Z3 shown in FIG. 13(D) which are produced from the same inputted line L will be apparent to have considerably different zigzag width or amplitude.

Figure 11:
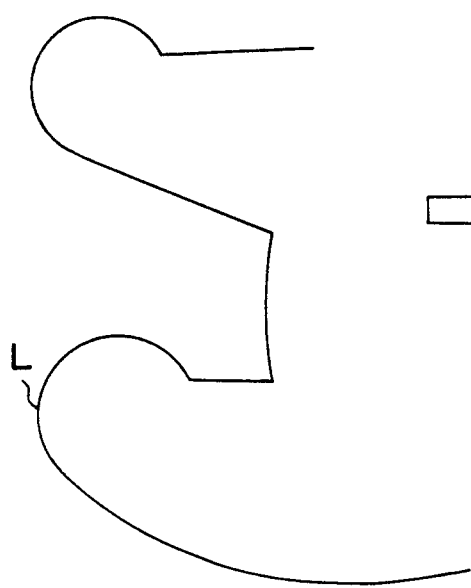
FIG. 11 is an example of an original pattern which is inputted by the input device to obtain a series of the coordinate data thereof.
Figure 12:
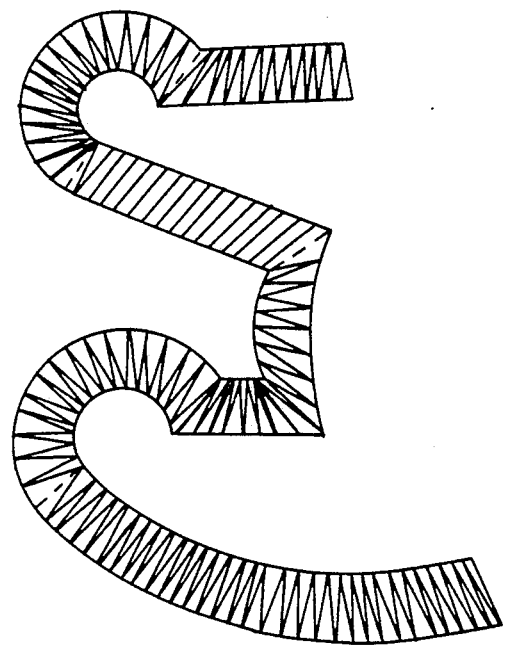
FIG. 12 shows a stitch pattern which is actually produced by the embroidering machine as a duplicate of the pattern of FIG. 11 after data conversion into the zigzag-boldface control data.
Figure 15:
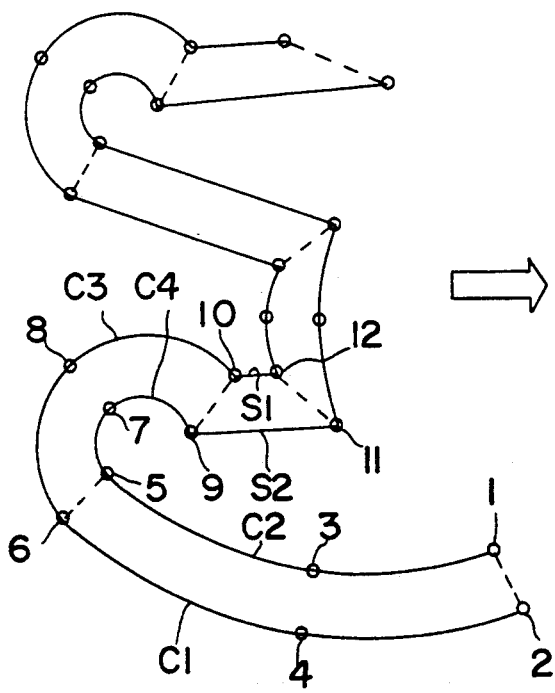
FIG. 15 is an example of an original pattern similar to that of FIG. 11 but shows a manner of input thereof in accordance with the prior art input technique.
Figure 16:
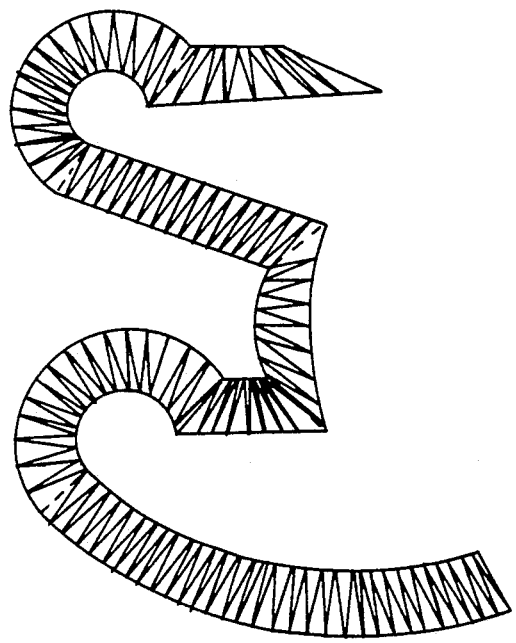
FIG. 16 shows a stitch pattern which is actually produced by the prior art embroidering machine for industrial purposes which is operated in response to data regarding points inputted in the manner shown in FIG. 15.

In accordance with the zigzag-boldfacing operation which has been described in detail, an inputted pattern L shown by way of example in FIG. 11 which has been inputted by means of the input device 40 operating in the zigzag-boldfacing mode, will be actually produced with the sewing machine 20 as a zigzag-boldfaced pattern such as shown in FIG. 12. Comparison with the pattern stitched in accordance with the prior art input technique shown in FIG. 15 and 16 will lead to the fact that this invention provides a simple and easy technique for duplicating the input pattern on the fabric as a boldfaced pattern with densely formed zigzag stitches, requiring no expert input operation.

Figure 14A:
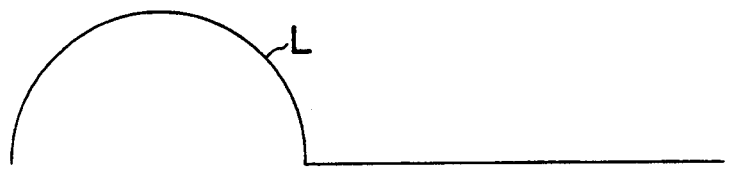
FIG. 14(A) through FIG. 14(C) are explanatory views showing diagrammatically a manner of conversion from the inputted coordinate data into corresponding multiple-boldface control data.
Figure 14B:
Figure 14C:

When, in turn, the boldface select switch 65 is so operated as to designate the multiple-boldfacing mode, the boldface control data is prepared based on the inputted coordinate data in a manner which will now be described in reference to FIG. 14(A) to FIG. 14(C). A trace line L shown in FIG. 14(A) which is an exact duplicate of the original picture has been obtained by a series of the coordinate data inputted by the stylus pen 35 at 0.2mm intervals. The line L is divided at every five input points P1, P2 . . . Pn and Pn+1 to imagine n-segments of straight lines, as shown in FIG. 14(B). Each linear segment has therefore substantially identical length of about 1.0mm. The length of the respective linear segments may be selected as desired by depression of the pitch select switch 67 arranged on the input device 40. The coordinates of the respective points P1, P2 . . . Pn and Pn+1 at which the duplicated line L is divided will then be read out from the second memory 56 to be now stored in the third memory 61 upon depression of the registration switch 68. The third memory also stores data regarding the number of straightaway stitches to be repeatedly produced between the adjacent two of the dividing points. The number should preferably be of an odd number 1, 3, 5 . . . which may be selectively designated by the operator's depression of a repeat select switch 70 also provided on the input device 40. FIG. 14(C) illustrates a pattern actually produced on the fabric when the straightaway stitches connecting between the respective two adjacent points are repeated three times.

The boldface select switch 65 is adapted to designate a selective one of the zigzag-boldfacing mode and the multiple-boldfacing mode in which the embroidering machine will operate in the foregoing manner. The boldface select switch 65 may also designate another mode in which a series of the coordinate data which have been inputted by the stylus pen 35 to be stored in the second memory 56 will remain unprocessed and be merely transferred to the third memory 61. In this non-boldfacing mode, the original picture will be reproduced on the fabric in accordance with the coordinate data thereof, as substantially an exact duplicate formed with a sequence of the straightaway stitches each simply connecting the adjacent two inputted points.

Although the invention has been described in conjunction with a specific embodiment thereof, it is to be understood that many variations and modifications may be made without departing from spirit and scope of the invention as defined in the appended claims.

What is claimed is:

1. An automatic embroidering system comprising:
   a sewing machine having a vertically reciprocating needle, a loop-taker means cooperating with said needle to form a stitch on a fabric, an embroidery frame located between said needle and said loop-taker means for supporting the fabric and a drive control means for shifting, under control, said embroidery frame in two perpendicular directions to provide a specific point at which the needle penetrates the fabric to form the stitch;
   input means for inputting a first series of data representing coordinates of substantially continuous points on an original pattern to be reproduced with said sewing machine, said input means being arranged separately from said sewing machine but connectable thereto;
   first memory means for storing said first series of pattern data;
   converting means for converting said first series of pattern data into a second series of data representing coordinates of stitch points of a pattern to be actually produced on the fabric with said sewing machine as a boldfaced reproduction of the original pattern; and
   second memory means for storing said second series of pattern data, said second series of pattern data being sequentially read out from said second memory to control operation of said drive control means provided in said sewing machine which is thus operable to produce the boldfaced pattern on the fabric.

2. The system according to claim 1 wherein said input means comprises a transparent touch panel adapted to be placed on the original pattern to be produced, a pen-like member for use in tracing the original pattern which may be seen through said transparent touch panel, and a voltage output circuit provided in said transparent touch panel for providing a voltage value outputted therefrom when a specific point on said transparent touch panel is designated by said pen-like member, said voltage value determining said first series of pattern data.

3. The system according to claim 1 wherein said converting means operates such that a line of the inputted pattern is divided into a predetermined number of first linear segments of substantially equal length, a pair of supplemental lines are drawn in parallel with each of the first linear segments at opposite sides thereof with an equal spacing therebetween to obtain a rectangular section per first linear segment, each of the supplemental lines in the rectangular section is equally divided into a predetermined number of second linear segments to determine stitch points at which zigzag stitches are to be produced with said sewing machine, whereby the coordinates of the sequential stitch points thus determined will constitute said second series of pattern data.

4. The system according to claim 3 wherein the number of the first linear segments is variable.

5. The system according to claim 3 wherein the equal spacing between the first linear segments and the supplemental lines thereof is changeable by a sewing machine operator.

6. The system according to claim 3 wherein said converting means operates such that a line of the inputted pattern is divided into a predetermined number of linear segments of substantially equal length to obtain dividing points along the line, and the linear segments are rotated at a predetermined angle alternately in opposite directions to shift the dividing points into different points located remote from the line, positioned alternately at opposite sides of the line, at which points constituting said second series of pattern data, zigzag stitches are to be produced with said sewing machine.

7. The system according to claim 6 wherein the number of the linear segments is variable.

8. The system according to claim 6 wherein the angle of rotation of the linear segments is changeable by a sewing machine operator.

9. The system according to claim 1 wherein said converting means operates such that a line of the inputted pattern is divided into a predetermined number of linear segments of substantially equal length to obtain dividing points along the line, the coordinates of end points of the respective linear segments being outputted from said converting means, and wherein said second memory means is also adapted to store data regarding a repeat number of stitches to be repeatedly formed along the respective linear segments, so that the actual pattern produced with said sewing machine in accordance with said second series of pattern data and said repeat number data comprises a sequence of linear segments formed with multiplicated stitches.

10. The sysem according to claim 9 wherein the number of the linear segments is variable.

11. The system according to claim 9 wherein the repeat number of the linear segmental stitches is changeable by a sewing machine operator.

* * * * *

UNITED STATES PATENT AND TRADEMARK OFFICE
CERTIFICATE OF CORRECTION

PATENT NO. : 5,005,500
DATED      : April 9, 1991
INVENTOR(S) : KENJI KATO, AKIRA ORII, MIKIO KOIKE and SHINICHI FUCHIGAMI It is certified that error appears in the above-identified patent and that said Letters Patent is hereby corrected as shown below:

Column 5, line 38, delete "ananlog" and insert --analog--.

Column 7, line 5, delete "liens" and insert --lines--;
         line 5, after "L2D" insert a semicolon (;);
         line 16, delete "NXKnD" and insert --(XKnD--.

Signed and Sealed this

Nineteenth Day of January, 1993

Attest:

DOUGLAS B. COMER

*Attesting Officer*    Acting Commissioner of Patents and Trademarks